March 20, 1951  C. P. KRUPP  2,545,817
SEALING CLOSURE
Filed Nov. 8, 1943  3 Sheets-Sheet 1
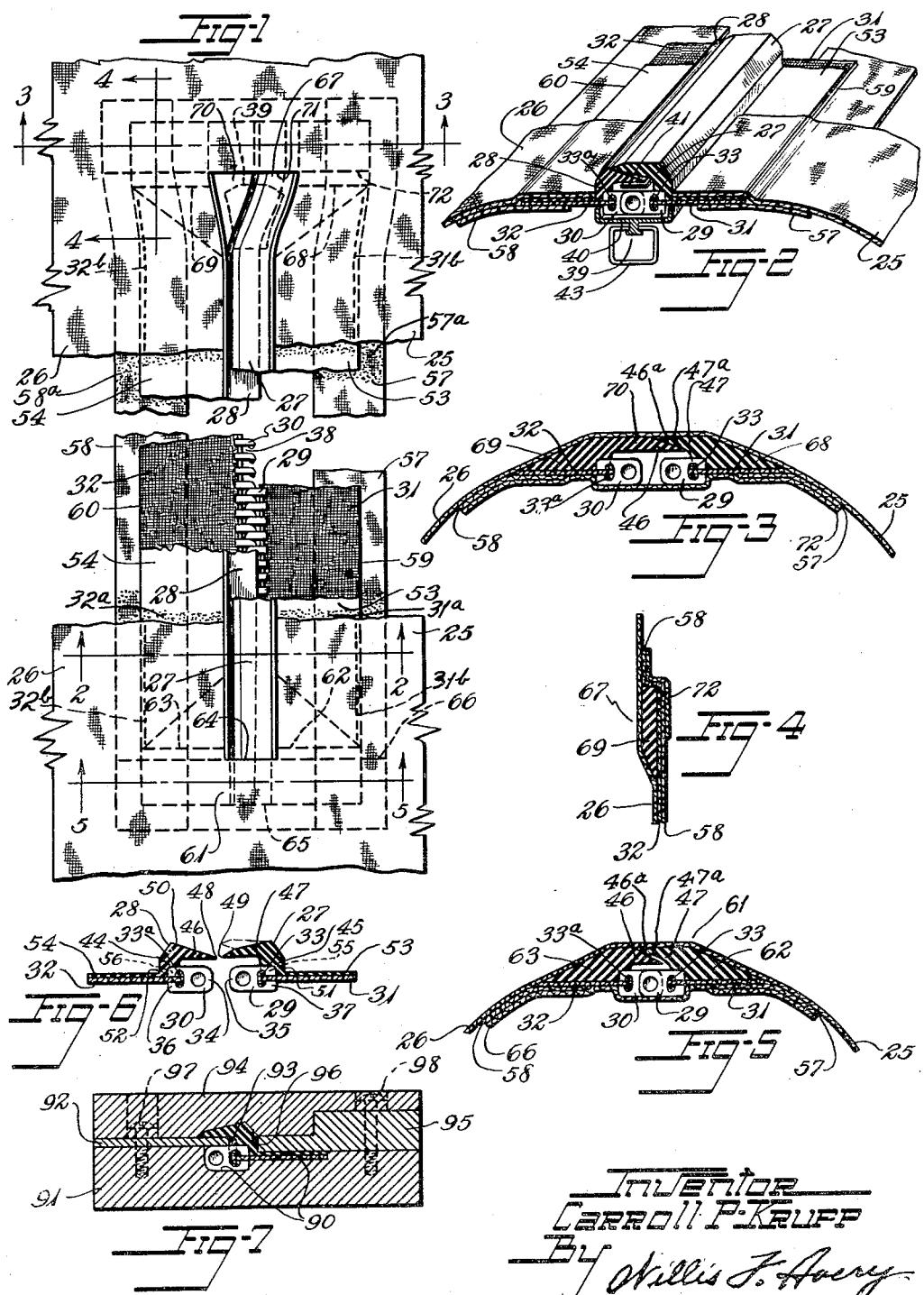
Inventor
Carroll P. Krupp
By Willis F. Avery
Atty.

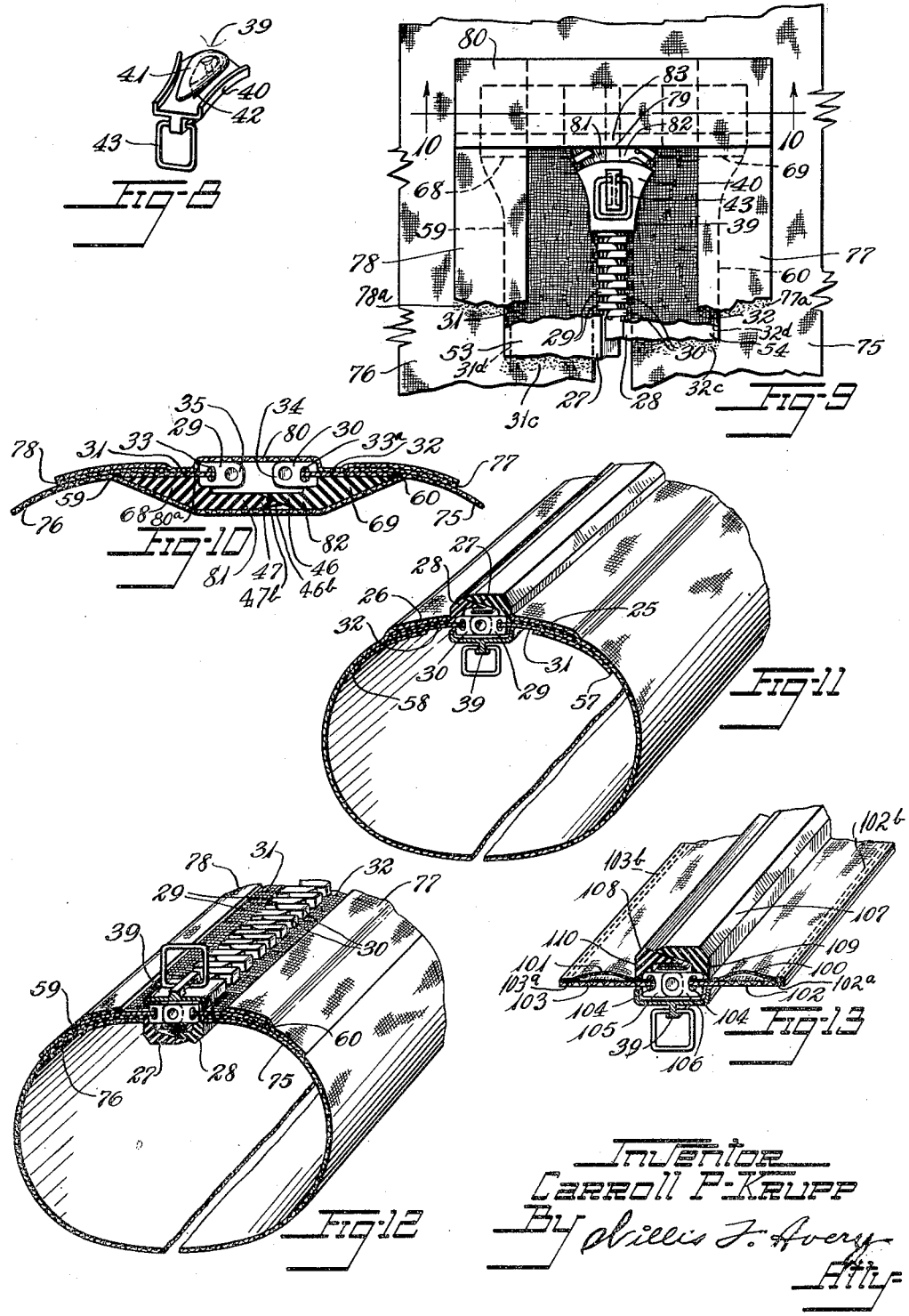

March 20, 1951
C. P. KRUPP
2,545,817
SEALING CLOSURE
Filed Nov. 8, 1943
3 Sheets-Sheet 3
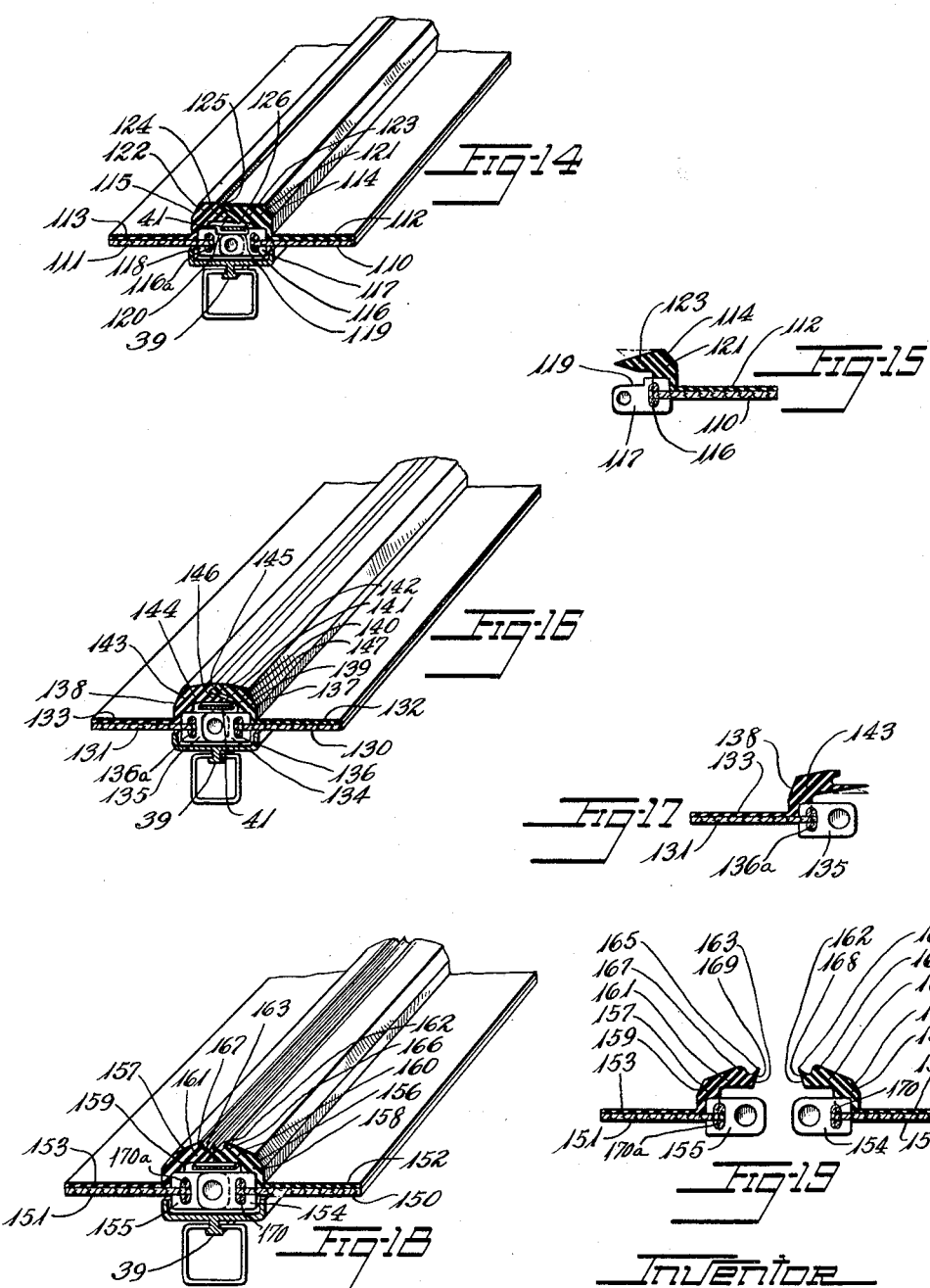

Patented Mar. 20, 1951

2,545,817

UNITED STATES PATENT OFFICE 2,545,817

SEALING CLOSURE

Carroll P. Krupp, Akron, Ohio, assignor to The B. F. Goodrich Company, New York, N. Y., a corporation of New York Application November 8, 1943, Serial No. 509,427

21 Claims. (Cl. 24—205.1)

This invention relates to closures for sealing adjacent margins and especially to sealing closures including slide fastener structures and to procedure for making the sealing closures.

Objects of the invention are to provide for closing and sealing effectively adjacent separable margins, to provide for maintaining the seal despite flexure of the margins, to provide closure means including sealing elements mounted directly upon joining members uniting such margins; to provide for mounting sealing elements directly in part upon the joining members and in part upon the margins; to provide for sealing the margins by continuous sealing elements bridging and mounted directly upon spaced-apart fastener elements at the margins; and to provide simplicity of construction, convenience of manufacture and effectiveness and ease of operation.

Other objects of the invention are to provide for sealing adjacent separable margins by lip-action of overlapping sealing elements mounted directly upon the joining members at such margins; to provide for closing the ends of the sealing closures; to provide procedure for making conveniently and economically such closures in a manner whereby the sealing elements are mounted directly upon mounting portions of the fastener elements while zones between the fastener elements at the engaging portions thereof are free of the material of sealing elements; and to provide flexibility and freedom of operation of such closures.

These and other objects and advantages of the invention will be apparent from the following description.

In the accompanying drawings which form a part of this specification and in which like numerals are employed to designate like parts throughout the same, Fig. 1 is a view showing a sealing closure attached to separable margins of an article to be fastened, and constructed in accordance with and embodying the invention, parts being broken away, Fig. 2 is a perspective view on an enlarged scale in section taken along line 2—2 of Fig. 1.

Fig. 3 is a sectional view on an enlarged scale taken along line 3—3 of Fig. 1,

Fig. 4 is a sectional view taken along line 4—4 of Fig. 1,

Fig. 5 is a sectional view taken along line 5—5 of Fig. 1,

Fig. 6 is a cross-sectional view of components of the sealing closure shown in Fig. 1 as such components are molded, the sealing margins being shown in a separated condition, Fig. 7 is a cross-sectional view of a mold arrangement for making the components of the sealing closure, Fig. 8 is a perspective view of a slider for the closure, Fig. 9 is a view showing a modified end closure construction for the sealing closure, Fig. 10 is a sectional view taken along line 10—10 of Fig. 9, Fig. 11 is a perspective view in section of a hollow article including the sealing closure attached to the adjacent separable margins thereof, Fig. 12 is a view like Fig. 11 but showing a modified attaching arrangement of the closure, Fig. 13 is a perspective view in section of a modified construction of the sealing closure, Fig. 14 is a view like Fig. 13 but showing another modified construction of the closure, Fig. 15 is a sectional view of one of the components of the closure shown in Fig. 14 as such component is molded, Fig. 16 is a view like Fig. 13 but showing still another modified construction of the closure, Fig. 17 is a sectional view of one of the components of the closure shown in Fig. 16 as such component is molded, Fig. 18 is a view like Fig. 13 but showing a further modification of the closure, and Fig. 19 is a sectional view of the components of the closure shown in Fig. 18 as such components are molded, the sealing margins being shown in a separated condition.

In my Patent 2,385,816 I have described a closure in which rubber lips are disposed in a manner to provide sealing action of the slide fastener, the rubber lips being mounted on the stringers and overlying but apart and spaced from the teeth of the fastener. While this has been found to give good results, in some conditions of flexure the slide fastener structure may be manipulated so that there is a tendency for the lips to part and lose their sealing action. In accordance with the present invention, I provide improved structure to increase the reliability of the seal under all conditions of flexure of the fastener encountered in use and to utilize to a maximum the advantages of the lip-sealing principle.

In the illustrative form of the invention shown in the drawings, Figs. 1 to 12, inclusive, the sealing closure includes a joining structure preferably a slide fastener structure for separably uniting adjacent margins 25 and 26 of an article to be fastened and includes sealing elements 27 and 28 of suitable flexible material such, for example, as resilient rubber or other rubber-like material mounted directly on joining members or fastener elements 29 and 30 of such structure, which fastener elements may be of metal or other stiff material. The slide fastener structure comprises flexible margins or stringers 31 and 32 of suitable material such, for example, as woven fabric, the adjacent marginal edges of the stringers 31 and 32 being provided with beads 33, 33a of fibrous cord material extending along the edges and attached as by sewing at each face of the stringers. The slide fastener structure also comprises opposing series of cooperating joining members or fastener elements 29 and 30 mounted at such marginal beaded edges, the fastener elements 29 and 30 including engaging portions 34 and 35 and mounting portions 36 and 37 at the beads 33, 33a and being spaced-apart whereby zones 38 are provided between the engaging portions of adjacent fastener elements along each of the marginal beaded edges of the stringers 31 and 32.

A slider 39 shown especially in Figs. 2 and 8 may be used for engaging and disengaging the engaging portions 34 and 35 of the fastener elements, which slider is operable along the opposing series of such elements. The slider 39 comprises a flanged member 40 and a plate member 41 spaced-apart from the flanged member and supported by a spreader post 42, and includes a pull-tab 43 preferably attached to the flanged member.

For closing and sealing the adjacent separable margins, the sealing elements 27 and 28 are mounted directly on the mounting portions 36 and 37 of the fastener elements 29 and 30 in overlapping and contacting relation, as shown especially in Fig. 2. Since the sealing elements may be made of rubber material, they may be molded against and adhered by a vulcanized bond to the fastener elements at the mounting portions 36 and 37 thereof, and extend continuously along the marginal edges of the stringers bridging the spaced-apart fastener elements of the respective series at such edges. However, the zones 38 between the adjacent engaging portions 34 and 35 of the fastener elements are free of the material of the sealing elements so that the relative movement of the elements 29, 30, for opening and closing the fastener, will not be objectionably restricted.

The sealing elements 27 and 28 include base portions 44 and 45 and marginal portions 46 and 47 tapering desirably to edges 48 and 49, the latter portions 46 and 47 overlying the fastener elements at the engaging portions in separated relation thereto thereby providing space for the free sliding movement of the plate member 41 of the slider 39 along the faces of the series of engaging portions 34 and 35. The relative positions of the sealing elements as molded and before engagement of the fastener elements are shown especially in Fig. 6.

The marginal portion 46 of the sealing element 28 may be provided with a substantially smooth sealing surface 50 extending angularly outward with respect to the adjacent faces of the fastener elements 30 toward the beaded edge of the stringer 32. Such marginal portion 46 may terminate substantially at or short of the ends of the engaging portions 34 of the fastener elements 30 for preventing interference with the fastener elements 29 and 30 during their engaging action.

The marginal portion 47 of the sealing element 27, as shown especially in Fig. 6, may extend beyond the ends of the fastener elements 29 for overlapping relation with the other sealing element 28 and may taper a lesser amount throughout its extent than that of the marginal portion 46 except at the region of its edge 49 where the taper is equal to or greater than that of the marginal portion 46 of the element 28. By virtue of the resiliency of the rubber material of the marginal portion 47, such marginal portion flexes to substantially the position shown by broken lines in Fig. 6, on engagement of the slide fastener elements. A pressure resisting seal at the sealing surface 50 by lip-action of the edge 49 is obtained due to the tendency of the marginal portion 47 to resist flexing somewhat because of such tapered construction which action presses the edge 49 against the sealing surface 50 while opposing areas of the sealing surface 50 and the marginal portion 47 trailing the edge 49 are maintained in spaced-apart relation, as shown especially in Fig. 2.

The base portions 44 and 45 of the sealing elements 27 and 28 support and maintain the tapered marginal portions 46 and 47 in cooperating positions during engaging and disengaging conditions of the slide fastener structure. As shown especially in Fig. 6, each base portion, and for explanation the portion 45 will be specifically discussed, extends continuously along and bridges the series of spaced-apart fastener elements 29 at the mounting portions 37 at the beaded margin of the stringer 31. Each base portion may include a relatively thin wall portion 51, 52 at the ends of the mounting portions of the fastener elements for protecting such ends and to provide, desirably, a relatively thin coating 53, 54 of suitable rubber material in continuation of the sealing element. Such coating may be adhered as by vulcanization to the adjacent face of the fabric stringers for sealing such stringers and for facilitating their attachment to the margins of the article by a suitable adhesive such, for example, as rubber cement 31a, 32a. Also, each base portion, includes integral filler portions 55, 56 which are disposed in the interstices between the mounting portions of the spaced-apart fastener elements along the beaded marginal edge of the stringer whereby a firm anchorage of the sealing element to the fastener elements is promoted.

The arrangement of the sealing elements 27 and 28 mounted directly upon the fastener elements as described hereinabove provides continuous sealing of the fastener elements at the beaded margin of the stringer while providing the desired sealing action, flexibility and ease of operation of the sealing closure. The stiffness of the fastener elements 29, 30, upon which the sealing elements are directly mounted, assists the maintenance of the sealing elements in their most effective relation for sealing, despite the flexibility of the adjoining wall material. A further advantage of such an arrangement is that the opposing slide fastener elements are maintained in the desired staggered relation for cooperative engagement, and are flexibly restrained against objectionable spreading movement with respect to each other by virtue of the resiliency of the rubber material of the sealing elements surrounding the mounting portions of the fastener elements at a face of the stringers.

The construction of the sealing elements, with reference, for example, to Fig. 6, includes provision for controlled flexure of the individual sealing elements such that effective sealing is maintained even though the closure as a whole be subjected to considerable bending, twisting or other flexure along its length. With reference to the right hand sealing element 27 shown in Fig. 6, which element is generally L-shape in section and rests upon the other sealing element 28 in the sealing condition, the laterally projecting or marginal portion, which tapers to a sealing edge, may be flexed elastically to a position such as is indicated by the broken lines. This allows for a latitude of flexure while maintaining the seal by lip-action of the edge against the other sealing element 28. In addition, the beveled construction at the outside outer corner of the element 27, as shown in Fig. 6, has the advantage of facilitating a further elastic hinging movement of such element 27 in the beveled region thereof, by virtue of the reduced thickness of resilient rubber material at such corner, thereby further assuring the maintenance of the seal during relatively severe bending movement of the closure as a whole.

With reference to the left hand sealing element 28 shown in Fig. 6, such element is also generally L-shape in section and includes a laterally projecting or marginal portion tapering to to edge and providing a sealing surface against which surface the right hand element 27 rests in the sealing condition. Such marginal portion may be flexed elastically for cooperating with the element 27 in maintaining the seal of the closure. In addition, the beveled construction at the outside outer corner of the sealing element 28 facilitates an elastic hinging movement of the element 28 in the beveled region of reduced thickness thereof, which movement increases the range of elastic hinging movement and is advantageous for further assuring cooperation of the left hand sealing element 28 with the right hand sealing element 27 in maintenance of the seal for a wide latitude of flexure of the closure.

In the operation and use of the sealing closure, it may be mounted at the adjacent margins 25 and 26 of the article to be fastened in the manner shown especially in Figs. 1 to 5, and 9 to 12. With the sealing elements 27 and 28 positioned at the exterior face of the wall of the article, the closure seals effectively such margins against predominant fluid pressure at the exterior face of the wall which pressure condition may exist for articles such, for example, as boots, overshoes, tents, sleeping bag enclosures and other related articles.

For the arrangement shown in Figs. 1 to 5 and 11, the sealing closure is so mounted that the sealing elements 27 and 28 are in overlapping and contacting relation at the exterior face of the wall of the article such as a boot, which wall may include woven fabric material having a coating or impregnation of rubber or other rubber-like material. The flexible stringers 31 and 32 are attached at the margins 25 and 26 of the opening in the wall of the boot as by a suitable rubber cement 31a, 32a, or by sewing 31b, 32b, or both, the rubber coatings 53 and 54 of the stringers being in abutting contact with the interior face of such wall at such margins for facilitating the attachment of the closure and for sealing the margins 25 and 26. For further sealing the margins 25 and 26, fabric tape members 57 and 58 including rubber-like material may be adhered by a suitable cement 57a, 58a in overlapping relation with such margins and stringers at the interior faces thereof, and the tape members extend along and over the marginal edges 59 and 60 of the stringers opposite the beaded marginal edges of the latter.

The sealing closure at one of its ends at 61 may be sealed effectively by the construction shown especially in Figs. 1 and 5. At such end at 61, the sealing elements 27 and 28 may be provided with shoulder portions 62 and 63 tapering to the marginal edges 59 and 60 of the stringers for bracing the sealing elements and preventing objectionable deformation of the ends thereof and for providing desirable continuity of surface against which surface the wall 25, 26 of the boot may be adhered as by rubber cement 31a, 32a. The overlapping marginal portions 46 and 47 of the sealing elements extending beyond the end 64 of the opening in the wall of the boot are cemented together by a suitable cement 46a, 47a at their opposing areas. The ends of the stringers 31 and 32 including the sealing elements 27 and 28 and the fastener elements 29 and 30 at 65 are sealed by a suitable fabric tape member 66 positioned transversely thereof and overlying and extending beyond such ends and the fastener elements to the ends of the tape members 57 and 58. The tape member 66 is adhered desirably thereto by a suitable adhesive. The arrangement is also similar to that shown in Fig. 4.

The sealing closure at the other end at 67 may be sealed by the construction shown especially in Figs. 1, 3 and 4. At such end 67, the sealing elements 27 and 28 may be provided with shoulder portions 68 and 69 similar to the shoulder portions 62 and 63. However, the sealing element 28 at the shoulder portion 69 includes a bracing wedge-like portion 70 integral with the tapered marginal portion 46 and extending toward the other sealing element 27 for maintaining the opposing areas trailing the edges 48 and 49 of the marginal portions 46 and 47 of such sealing elements in abutting contact while promoting positioning the fastener elements and stringers along the lines of curvature which the stringers tend to assume during engagement of the fastener elements adjacent the end at 67 by virtue of the spreading action on the opposing fastener elements by the spreader post 42 of the slider 39.

The ends of the stringers and sealing elements including the shoulder portions 68 and 69 and the bracing portion 70 are adhered by a suitable cement 31a, 32a to the interior face of the wall of the boot at the region of such end at 67. The opposing areas of the overlapping, tapered marginal portions 46 and 47 of the sealing elements 27 and 28 are also adhered together as by rubber cement 46a, 47a where such areas extend beyond the edge 71 of the opening in the wall of the boot. The fabric tape members 57 and 58 and a suitable fabric tape member 72 positioned transversely thereof and overlying and extending beyond the ends of the stringers and the sealing elements are desirably adhered thereto and to the wall of the boot, as shown especially in Figs. 3 and 4. Such an arrangement seals effectively the sealing closure at the end at 67.

When the sealing closure is in the closed condition shown in Fig. 1, it is conveniently altered to the open condition for permitting access to the interior of the article by sliding the slider 39 along the opposing series of fastener elements 29 and 30 toward the opposite end of the closure at 61. Such sliding action disengages the cooperating fastener elements and spreads apart the stringers 31 and 32 by virtue of the spreading action of the spreader post 42 of the slider 39 thus separating the sealing elements 27 and 28 to an extent that they are no longer in sealing and contacting relation. The spreading action of the slider 39 causes the stringers 31 and 32 to flex and curve outwardly adjacent the spreader post 42 with respect to the center line of the sealing closure thus causing the sealing elements to assume a similar flexed and curved position at the region of such spreader post.

By virtue of such flexed condition of the sealing elements, the tapered marginal portions 46 and 47 thereof are in a stressed condition whereby the relatively short extent of the marginal portion 46 causes such portion at the region of the edge 48 thereof to bend toward the fastener elements 30, while the relatively long extent of the marginal portion 47 causes such portion at the region of the edge 49 thereof to bend away from the fastener elements 29. This bent condition of the marginal portions promotes the free coaction of the sealing elements during re-engagement of the closure.

The sealing closure is placed in the closed condition by sliding the slider 39 toward the other end at 67 which action engages the cooperating fastener elements and draws together the stringers to an extent that the sealing elements are in the desired overlapping and contacting relation. Since the marginal portion 46 is bent toward the fastener elements and the marginal portion 47 is bent away from the fastener elements as described hereinabove, the sealing elements coact freely with one another during the engaging action of the slider and no interference of the respective edges 48 and 49 with one another and with the fastener elements occurs. The marginal portion 46 resumes its separated position relative to the fastener elements 30 and the edge 49 of the marginal portion 47 slides smoothly over the sealing surface 50, the marginal portion 47 flexing by virtue of the resiliency of its material such that sealing of the closure is obtained by lip-action of the edge 49 in contact with the sealing surface while the opposing areas of the overlapping marginal portions 46 and 47 trailing the edge 49 are maintained in spaced-apart relation as shown especially in Fig. 2. In this manner the adjacent margins of the opening in the boot are sealed along their extent.

Positioning the slider 39 at the end at 67 as shown in Fig. 1, causes the sealing element 27 to assume its overlapping and contacting relation with the other element 28 at the region of the bracing wedge-like portion 70 and causes the element 28 to press against the sealing element 27 such that the marginal portions 46 and 47 at the opposing areas thereof may be substantially in abutting contact along the integrally united portions 46 and 70 which contact in addition to the lip sealing by the edge 49, thus seals effectively the closure at the end at 67.

For the arrangement of the sealing closure shown in Figs. 9, 10 and 12, which arrangement is adapted to seal against predominant internal pressure within the article such, for example, as an inflatable container for supplies, the construction is such that the sealing elements 27 and 28 are disposed within the interior of the article and the slider may be arranged for manipulation from the exterior or, if desired, from the interior of the article. The flexible stringers 31 and 32 may be attached at the exterior faces of margins 75 and 76 of the opening in the wall of the inflatable container by a suitable adhesive 31c, 32c, or by sewing 31d, 32d or both. Suitable fabric tape members 77 and 78 may be adhered 77a, 78a to the stringers and margins 75 and 76 along the opposite marginal edges 59 and 60 of the stringers for further sealing and for protecting the stringers.

While the construction for such sealing closure at the respective ends thereof may be substantially like that described hereinabove for the arrangement shown in Fig. 1, the modified construction shown especially in Figs. 9 and 10 may be used, if desired, at one end thereof. The sealing elements 27 and 28 may be provided with tapered shoulder portions 68 and 69 at the ends of the stringers 31 and 32 which stringers and sealing elements extend beyond the marginal edge at 79 of the opening in the wall of the container and are sealed at their ends by a suitable fabric tape member 80 positioned transversely thereof and overlying and adhered as by a suitable cement 80a to such ends, as shown in Fig. 10, and extending beyond the latter ends including the ends of the tape members 77 and 78.

The sealing elements 27 and 28 at the shoulder portions 68 and 69 include bracing wedge-like portions 81 and 82 terminating in the tapered marginal portions 46 and 47, the latter portions sealing by an overlapping and abutting contact relation and may be adhered together by a suitable adhesive 46b, 47b at 83 at their opposing areas extending from substantially at 79 to their ends. The ends of the stringers and sealing elements are flared to conform to the spreading action of the slider 39 as described hereinabove, which flaring facilitates the smooth engagement of the fastener elements and the lip-sealing action of the sealing elements along the marginal portions 46 and 47 at the region of the bracing wedge-like portions 81 and 82. Such construction may also be provided for the end at 67 of the sealing closure arrangement shown in Fig. 1.

In the operation of the sealing closure shown in Fig. 9, such closure is placed in the open condition in a manner similar to that described hereinabove for the construction shown in Fig. 1. For closing and sealing the opening in the inflatable container, the slider 39 is moved toward the open end at 79 engaging the opposing series of cooperating fastener elements and positioning the sealing elements 27 and 28 in the overlapping and contacting relation shown in Fig. 12 for providing the desired sealing by lip-action of the edge 49 against the sealing surface 50. At the end adjacent the shoulder portions 68 and 69 of the sealing elements, the engaging action of the slider 39 upon the fastener elements and stringers draws together the bracing portions 81 and 82 and the marginal portions 46 and 47 whereby the opposing areas of such marginal portions assume substantially an abutting contact relation in addition to sealing by lip-action of the edge 49 against the sealing surface 50, the bracing portions 81 and 82 and the marginal portions 46 and 47 coacting to provide the desired sealing of the closure at the end at 79.

Each component of the sealing closure comprising a flexible stringer, a series of spaced-apart fastener elements at the marginal edge of the stringer, and a sealing element, may be made by molding the sealing element directly upon the fastener elements as shown especially in Fig. 7.

The fabric stringer 31, for example, having the beaded marginal edge 33 and including the series of fastener elements 29 at such edge is placed in a mold recess 90 in a lower mold plate 91. A shield 92 may be positioned over the faces of the fastener elements partially over the extent of the engaging portions thereof, and a suitable adhesive may be painted on the exposed faces of the mounting portions of the fastener elements and the stringer for promoting adhesion of the rubber to such faces and for facilitating positioning a dam 93 of flexible material such, for example, as a cord material at the margin of the shield 92 and along the series of fastener elements overlying the latter elements adjacent the beaded marginal edge of the stringer. An extruded strip, for example, of suitable resilient rubber material for providing the desired flexibility and hardness of the sealing element is positioned along and overlying the fastener elements and adhered thereto by a suitable adhesive. A second extruded strip of suitable rubber material may be positioned along and adhered to the fabric stringer at its exposed face, which latter rubber material has greater flexibility and less hardness, when cured, than that of the material of the sealing element for providing the desired flexibility of the stringer.

An upper mold plate 94 which may include a metal insert 95 and having a mold recess 96 is positioned in register with the lower mold plate 91, the shield and metal insert being secured to the lower mold plate as by screws 97 and 98.

The assembled mold is then placed in a suitable curing press and subjected to heat and pressure for vulcanizing and molding the sealing element against the fastener elements at the mounting portions thereof, the shield 92 and the dam 93, for vulcanizing and molding the rubber coating 53 upon the stringer 31 in continuation of the sealing element 27. The mold is removed from the press at the end of the curing period and the upper mold plate 94, shield 92 and metal insert 95 are detached and removed from the lower mold plate 91, first unscrewing the screws 97 and 98. The stringer including fastener elements and sealing element is removed from the mold recess in the lower mold plate, and the dam 93 is then removed thereby leaving the sealing elements adhered against and bridging the fastener elements at the mounting portions and overlying the latter elements at the engaging portions in separated relation thereto.

When the dam of cord material is under molding pressure, such material flexes substantially into contact with the adjacent beading marginal edge of the stringer at the interstices between adjacent fastener elements at the mounting portions thereof thereby preventing effectively flow of the rubber material of the sealing elements into the zones between the fastener elements at the engaging portions thereof while permitting flow of the rubber material into such interstices, as shown especially in Fig. 6. If desired, the beads 33, 33a at the marginal edges of the stringers 31, 32 may provide such damming action instead of the dam 93, in which case the beads 33, 33a comprise relatively soft, loosely-woven cord material capable of being compressed at the fastener elements and capable of substantially expanding in the interstices between the fastener elements at the marginal edges of the stringers to substantially the adjacent faces of such elements, as shown especially in Fig. 15.

Still another means for obtaining the desired damming action may be the use of a dam comprising a strip of yieldable material such, for example, as a relatively soft lead material disposed against and overlying the engaging portions of the fastener elements adjacent the margin of the stringer, the lead material being pressed into and partially filling the zones intermediate adjacent engaging portions such that it contacts the beaded marginal edge of such stringer. In this manner the lead strip prevents effectively the rubber material entering such zones while assuring separation of the sealing element from the engaging portions of the fasteners.

After the molding operation described hereinabove, the lead strip is removed from the fastener elements.

The flared construction of the stringers and sealing elements at one end of the sealing closure, which construction is shown especially in Figs. 1 and 9, may be obtained during the molding operation by means of suitable mold recesses in the upper and lower mold plates for so forming such end portions. Such an arrangement is desirable for preventing wrinkling of the flexible stringers at the open end due to the flared and bent condition thereof.

The modified construction of the sealing closure shown in Fig. 13 provides extensive flexibility of the stringers and ease of operation of the closure. To this end covering flaps 100 and 101 of relatively thin woven fabric material including a coating or impregnation of suitable rubber material are superimposed upon and overlie the faces at one side of the flexible stringers 102 and 103, which stringers are desirably of suitable woven fabric relatively thicker than that of the covering flaps. The substantially fluid-tight covering flaps 100 and 101 may be attached at and along the respective margins of the stringers as by rubber cement 102a, 103a, or sewing 102b, 103b, or both, and are in a loose unattached condition intermediate such margins of the stringers 102 and 103 for facilitating free flexible movement. Beads 104, 104a of suitable fibrous cord material are attached as by sewing at each face of the stringers at the adjacent marginal edges thereof, being superimposed on the covering flaps. Opposing series of spaced-apart cooperating fastener elements 105 and 106 are mounted upon the adjacent marginal edges of the stringers, and the fastener elements are engaged and disengaged by manipulation of the slider 39.

Sealing elements 107 and 108 of suitable rubber material are desirably molded and vulcanized directly against the fastener elements at the mounting portions of the latter elements, the sealing elements extending along and bridging the fastener elements at the beaded marginal edges of the stringers, as described hereinabove for the sealing closure shown in Figs. 1 to 12. The material of the sealing elements extends over the ends of the mounting portions of the fastener elements at 109 and 110 providing relatively thin wall portions united with the rubber surfaces of the covering flaps 100 and 101 for further sealing the stringers. The sealing elements 107 and 108 are constructionally similar to the sealing elements 27 and 28 described hereinabove, and cooperatively seal the closure by a lip-action like that previously described for the elements 27 and 28. The relative positions of the sealing elements as molded are substantially like those shown in Fig. 6.

Since the covering flaps 100 and 101 are in a loose unattached condition intermediate the margins of the respective stringers and since the covering flaps may be adhered by a suitable adhesive to the wall of the article to be fastened, such an arrangement facilitates extensive flexing of the stringers 102 and 103 intermediate their margins during the engaging and the disengaging of the fastener elements thereby promoting ease of operation of the sealing closure while sealing the adjacent margins of the opening in such wall.

When the fastener elements 105 and 106 are engaged by sliding the slider 39 along such elements, the sealing elements 107 and 108 assume the overlapping and contacting relation for sealing by lip-action of the edge of the marginal portion of the sealing element 107, as described hereinabove for the sealing elements 27 and 28, thus closing effectively the adjacent margins.

In the modification of the sealing closure shown in Figs. 14 and 15, flexible stringers 110 and 111 of suitable fabric include coatings 112 and 113 of suitable resilient rubber-like material at one face of the stringers for sealing the latter and for facilitating attachment adhesively to the adjacent separable margins of the article to be fastened, which coatings may be integral and in continuation with the sealing elements 114 and 115 at such faces of the stringers. Beads 116, 116a of suitable fibrous cord material are attached as by sewing to the adjacent marginal edges of the stringers and fastener elements 117 and 118 are attached in staggered spaced-apart relation at and along such marginal edges. The beads 116, 116a may comprise relatively soft, loosely woven cord material which material is compressed at the fastener elements and is in a substantially expanded condition in the interstices between the fastener elements as shown especially in Fig. 15, for providing the desired damming action during molding of the closure as described hereinabove.

The fastener elements 117 and 118 have registering recessed portions 119 and 120 in their engaging portions at the faces thereof adjacent the sealing elements, which recessed portions define a groove extending along the fastener elements substantially at the center line of the closure and in which groove the plate member 41 of the slider 39 may be disposed for sliding therein. This arrangement permits reducing the extent of separation of the marginal portions of the sealing elements from the adjacent faces of the fastener elements thus promoting a relatively compact sealing closure construction.

The sealing elements 114 and 115 comprising suitable resilient rubber-like material which may be less flexible than the material of the coatings 112 and 113 of the stringers, are mounted directly upon the fastener elements at the mounting portions and adjacent the recessed portions of the latter elements, the sealing elements being constructed and arranged for providing the desired overlapping and contacting relation for closing the adjacent margins. The sealing elements 114 and 115 comprise base portions 121 and 122 mounted against the mounting portions of the fastener elements and marginal portions 123 and 124 tapering to edges 125 and 126, the latter portions 123 and 124 overlying the fastener elements at the engaging portions thereof in separated relation thereto and terminating substantially at or near the ends of the engaging portions. The marginal portions 123 and 124 at the region of the edges 125 and 126 taper to a greater extent than the remainder of such marginal portions whereby sealing by lip-action of the edge 125 in contact with the marginal portion 124 at the region of greater taper is obtained while opposing areas of such portions trailing the edge 125 are maintained in spaced-apart relation. Flexure of the marginal portion 123 to the position shown by broken lines in Fig. 15, during engagement of the fastener elements facilitates the lip-action sealing by the sealing elements assuring the desired fluid-tight seal.

In the operation of the closure the slider 39 slides along the fastener elements engaging the latter. The plate member 41 of the slider is disposed in the groove and is substantially free of contact or interference with the sealing elements thereby promoting freedom of movement and ease of operation. During the engaging action of the slider on the fastener elements, the edge 125 of the marginal portion 123 slides smoothly over the sealing surface of the marginal portion 124 at the region of the edge 126, the marginal portion 123 flexing and sealing by lip-action of the edge 125 against such surface and being in overlapping and contacting relation with the marginal portion 124.

The modified arrangement of the sealing closure shown in Figs. 16 and 17 comprises flexible stringers 130 and 131 including suitable woven fabric and coatings 132 and 133 of suitable resilient rubber-like material at one face thereof. Opposing series of cooperating fastener elements 134 and 135 are mounted at adjacent beaded marginal edges 136, 136a, which fastener elements are engaged by the slider 39 operable along such elements.

Sealing elements 137 and 138 of suitable rubber material are mounted directly upon the fastener elements 134 and 135 against the mounting portions thereof at the beaded marginal edges of the stringers. The sealing element 137 comprises a base portion 139 extending along and bridging the spaced-apart fastener elements 134 at the beaded marginal edge 136 of the stringer 130 and comprises a tapering marginal portion 140 including an inner sealing surface 141 adjacent the faces of the fastener elements 134, the marginal portion 140 terminating in a projecting end portion 142 for seating against the other sealing element 138 as shown in Fig. 16.

The other sealing element 138 which is shown in Fig. 17 in the "as molded" condition by full lines and in the "as engaged" condition by broken lines, comprises a base portion 143 extending along and bridging the spaced-apart fastener elements 135 at the mounting portions thereof and comprises a marginal portion 144 including a portion 145 having a recess for receiving in abutting and sealing contact the projecting end portion 142 of the sealing element 137. The marginal portion 144 terminates in a portion 146 tapering to an edge 147 for contacting the inner sealing surface 141 in lip-sealing relation while opposing areas of the sealing elements 137 and 138 trailing the edge 147 are maintained in spaced-apart relation.

When the closure is closed by sliding the slider 39 along the opposing series of fastener elements thus engaging the latter, the sealing elements 137 and 138 are positioned in overlapping relation, the marginal portions 140 and 144 overlying and being separated from the faces of the fastener elements 134 and 135 thereby providing space for the plate member 41 of the slider 39. When the sealing elements are so positioned the projecting end portion 142 registers with the recess of and is in abutting and sealing contact with the portion 145 of the sealing element 138 while the tapered portion 146 flexes with the edge 147 thereof in lip-sealing contact against the inner sealing surface 141. Such an arrangement of the sealing elements provides for sealing effectively the adjacent margins of the closure while preventing accidental breakage of the lip-seal of the edge 147 against the inner sealing surface 141, and is adapted to withstand fluctuations in pressure at either of the faces of the closure.

The modified construction of the sealing closure shown in Figs. 18 and 19 includes suitable flexible stringers 150 and 151 having resilient rubber coatings 152 and 153 at one of their faces and includes opposing series of cooperating fastener elements 154 and 155 mounted at the adjacent beaded marginal edges 170, 170a of such stringers. The fastener elements are engaged by manipulation of the slider 39 along such series of elements.

Sealing elements 156 and 157 of suitable rubber material extend along and bridge the fastener elements and are mounted directly upon the mounting portions of the latter elements at the beaded marginal edges of the stringers. The sealing elements comprise base portions 158 and 159 and portions 160 and 161 overlying and separated from the engaging portions of the fastener elements. The latter portions 160 and 161 include marginal portions 162 and 163 tapering to edges 164 and 165 and extending outwardly relative to the fastener elements and also include protecting portions 166 and 167 of generally rounded contour adjacent and spaced from the tapered marginal portions for preventing accidental separation of such tapered portions, especially at the edges thereof.

For the "as molded" condition of the sealing elements as shown especially in Fig. 19, the tapered marginal portions 162 and 163 including sealing surfaces 168 and 169 are constructed and arranged such that the sealing surfaces are angularly inclined relative to the fastener elements and to each other. As shown in Fig. 19, the relatively inclined sealing surfaces 168 and 169 in the open condition of the closure are overlapped and substantially opposite one another and extend substantially normal to the face of the closure, i. e., not absolutely normal but a little less than normal to such face. During engagement of the fastener elements, such tapered marginal portions are flexed such that the sealing surfaces 168 and 169 are substantially in overlapping and abutting contact along their extent while the edges 164 and 165 are in sealing relation by lip-action of such edges. The protecting portions 166 and 167 extend outwardly relative to the fastener elements to at least the height of the edges 164 and 165 to prevent accidental separation of the latter and breakage of the fluid-tight seal of the closure.

In the operation of the modified closure the slider 39 is manipulated along the fastener elements engaging the same thus bringing together the sealing elements whereby the marginal portions 162 and 163 are flexed such that the sealing surfaces 168 and 169 are substantialy in abutting contact and the edges 164 and 165 are in sealing contact by lip-action against one another, effectively sealing the closure.

Variations may be made without departing from the scope of the invention as it is defined in the following claims.

I claim:

1. A flexible closure for sealing adjacent separable margins both of which are subject to flexure, said closure comprising separable fastener elements at said margins interengaging one another and uniting the margins in the closed condition of the closure, a stringer at each margin supporting said fastener elements in series, and sealing elements comprising resilient rubber-like material mounted directly upon and supported by said fastener elements and the stringers at said margins in position for engaging one another in overlapping relation in the closed condition, one of said sealing elements including a marginal portion of said rubber-like material tapering to an edge, said marginal portion and the other sealing element being in such relative position that upon engagement of said fastener elements said edge contacts and resiliently presses against said other sealing element in sealing relation therewith by lip-action flexure of said edge.

2. A sealing closure for adjacent margins both of which are subject to flexure, said closure comprising slide fastener elements of stiff material at the adjacent edges of the margins interengaging each other and separably uniting said margins in the closed condition of the closure, a slider for engaging and disengaging said fastener elements, and sealing elements of resilient rubber-like material mounted directly upon and supported by said fastener elements at said margins in position for engaging one another in overlapping relation in the closed condition, said sealing elements comprising base portions positioned at least in part directly on said fastener elements and portions of said rubber-like material projecting laterally from said base portions toward each other and overlying said fastener elements in spaced-apart relation thereto, at least one of the lateral portions tapering to an edge and being in such relative position with respect to the other lateral portion that upon engagement of said fastener elements said edge contacts and resiliently presses against said other lateral portion in sealing relation therewith by lip-action flexure of said edge, said base portions and said lateral portions in the closed condition having a recess between said base portions and between said lateral portions and said fastener elements for accommodation of a part of said slider and to permit sliding movement of said part of the slider along and within said recess for opening and closing the closure.

3. A flexible sealing closure for attachment to the separable margins of an article to be fastened, said closure comprising a pair of flexible stringers for attachment to said margins and interconnecting the same in the closed condition of the closure, opposing series of cooperating slide fastener elements of stiff material at the adjacent edges of said stringers interengaging each other and separably uniting said stringers in the closed condition, and sealing elements comprising resilient rubber-like material adhered to said fastener elements at a face of said stringers and mounted directly upon and supported by said fastener elements in position for engaging one another in overlapping relation in the closed condition, one of said sealing elements including a marginal portion of said rubber-like material tapering to an edge and being in such relative position with respect to the other sealing element that upon engagement of said fastener elements said edge contacts and resiliently presses against said other sealing element in sealing relation therewith by lip-action flexure of said edge.

4. A flexible closure for sealing adjacent margins both of which are subject to flexure, said closure comprising separable fastener elements at said margins interengaging one another and uniting the margins in the closed condition of the closure, a sealing element of flexible material mounted at one of said margins, and an element of elastic material at the other margin for engaging said sealing element in overlapping relation therewith and to said fastener elements when in the closed condition, the elastic element including a base portion mounted directly upon and supported by said fastener elements at said other margin and having a portion of elastic material extending laterally from said base portion toward said sealing element and tapering to an edge, the lateral portion and said sealing element being in such relative position that upon engagement of said fastener elements said edge contacts and elastically presses against said sealing element in sealing relation therewith by lip-action flexure of said edge, said lateral portion providing an inner surface having a juncture with a surface of said base portion, the thickness of the elastic material of said base portion being reduced in the region at the side of said juncture in the direction away from that of said lateral portion and adjacent said lateral portion thereby providing an elastic hinging movement of said elastic material in said region for facilitating flexure of said elastic element while maintaining the seal of the closure.

5. A flexible closure for sealing adjacent margins both of which are subject to flexure, said closure comprising separable fastener elements at said margins interengaging one another and uniting the margins in the closed condition of the closure, and sealing elements of resilient rubber-like material at said margins for sealing by an overlapping contacting relation of said sealing elements in the closed condition, each of said sealing elements being generally L-shaped in section providing a base portion mounted directly upon and supported by said fastener elements and a portion of said rubber-like material extending laterally from said base portion toward the other sealing element, at least one of the lateral portions tapering to an edge and being in such relative position with respect to the other sealing element that upon engagement of said fastener elements said edge contacts and resiliently presses against said other sealing element in sealing relation therewith by lip-action flexure of said edge, the lateral portion of each sealing element providing an inner surface having a juncture with a surface of said base portion of the element, the thickness of the rubber-like material of said base portion of each sealing element being reduced in the region at the side of said juncture in the direction away from that of said lateral portion and adjacent said lateral portion thereby providing a resilient hinging movement of said resilient rubber-like material in said region for facilitating flexure of the sealing elements while maintaining the seal of the closure.

6. A flexible closure for sealing adjacent margins both of which are subject to flexure, said closure comprising slide fastener means including fastener elements of stiff material interengaging one another and separably uniting said margins in the closed condition of the closure, and a pair of sealing elements of resilient rubber-like material at said margins for sealing by overlapping and contacting relation of said sealing elements in the closed condition, each of said sealing elements being generally L-shape in cross-section providing a base portion mounted directly upon and supported by said fastener elements and a tapered portion extending laterally from said base portion in the direction toward the other sealing element and terminating in an edge, the edge of one of the tapered portions contacting the other tapered portion in sealing relation therewith by lip-action of the latter said edge, said tapered portion of each element providing an inner surface having a juncture with a surface of the base portion of the element, and each of said sealing elements being beveled at the outside outer corner thereof providing by virtue of the bevel an upper portion of reduced thickness of said base portion at the side of said juncture in the direction away from that of said tapered portion and providing a hinging zone of said resilient material at said upper portion of said base portion for facilitating flexure of the sealing elements while maintaining the seal of the closure.

7. A flexible closure for sealing adjacent separable margins both of which are subject to flexure, said closure comprising separable fastener elements at said margins interengaging one another and uniting the margins in the closed condition of the closure, flexible sealing elements mounted directly upon and supported by said fastener elements in position for sealing by an overlapping contacting relation of said sealing elements in the closed condition, one of said sealing elements having an edge for contacting a marginal portion of the other sealing element in sealing relation therewith by lip-action of said edge, and means for sealing an end of the closure, said means comprising a bracing wedge-like portion extending in continuation of and integral with one of said sealing elements at said end and disposed for maintaining sealing contact with the other sealing element in the closed condition.

8. A flexible closure for sealing adjacent separable margins both of which are subject to flexure, said closure comprising separable fastener elements at said margins interengaging one another and uniting the margins in the closed condition of the closure, flexible sealing elements mounted directly upon and supported by said fastener elements in position for sealing by an overlapping contacting relation of said sealing elements in the closed condition, said sealing elements including resilient marginal portions tapering to edges and one of said edges contacting and resiliently pressing against said marginal portion of the other sealing element in sealing relation therewith in the closed condition by lip-action flexure of such edge, and means for sealing an end of the closure, said means comprising bracing wedge-like portions extending in continuation of and integral with said marginal portions of said sealing elements at said end and each of said bracing portions extending toward the adjacent sealing element for maintaining said sealing elements and said wedge-like portions in sealing relation in the closed condition.

9. A sealing closure for attachment to the separable margins of an article to be fastened, said closure comprising flexible stringers for attaching to said margins and interconnecting the same in the closed condition of the closure, fluid-tight flexible covering flaps overlying and attached to said stringers at one face thereof for sealing the same, said flaps having the attachments at positions spaced-apart laterally of said stringers and being in a loose separated condition relative to said stringers between the positions of attachment to said stringers for facilitating free flexible movement of said stringers, cooperating fastener elements at the adjacent margins of said stringers interengaging each other and separably uniting the stringers in the closed condition, and sealing elements at said face of said stringers mounted directly upon and supported by said fastener elements and contacting said covering flaps in sealing relation therewith, said sealing elements being constructed and arranged to contact one another in sealing relation in the closed condition.

10. A sealing closure for attachment to the separable margins of an article to be fastened, said closure comprising flexible stringers for attaching to said margins and interconnecting the same in the closed condition of the closure, opposing series of cooperating fastener elements at the adjacent edges of said stringers interengaging each other and separably uniting the stringers in the closed condition, said fastener elements including recessed end portions in register at a face thereof at one side of said stringers for defining a groove along said series intermediate said adjacent edges of said stringers, a slider including a member disposed in said groove and movable along said fastener elements for engaging and disengaging the same, and sealing elements mounted directly upon and supported by said fastener elements in position for sealing by overlapping and contacting relation of said sealing elements.

11. A flexible sealing closure comprising cooperating fastener elements separably interengaging each other in the closed condition of the closure, and sealing elements mounted directly upon and supported by said fastener elements for sealing by overlapping relation with one another in the closed condition, one of said sealing elements including a sealing surface and terminating in a projecting end portion, and the other of said sealing elements comprising a portion having a recess for receiving said projecting end portion of the first said sealing element in abutting contact therewith in the closed condition and terminating in a marginal portion extending from the recessed portion and tapering to an edge for contacting in the closed condition said sealing surface of the first said sealing element in sealing relation therewith by lip-action of said edge.

12. A sealing closure comprising a structure having a pair of flexible adjacent stringers, cooperating slide fastener teeth in series on said stringers and a slider for engaging and disengaging said teeth progressively along the extent of said stringers, a flexible element on one of said stringers at a face of the structure presenting a sealing surface extending approximately normal but slightly inclined to said face, and a flexible sealing element mounted directly upon and supported by said teeth of the other of said stringers at said face having a marginal portion tapering to an edge and said sealing element presenting a second sealing surface extending approximately normal but slightly inclined to said face and continuing to said edge of the element, said elements in the open condition of the closure being positioned with said sealing surfaces substantially opposite one another with at least one of said sealing surfaces inclined toward the other sealing surface in such relative position that in the closed condition of the closure said edge contacts and flexibly presses against the first said sealing surface in sealing relation therewith by lip-action flexure of said edge.

13. A sealing closure comprising a structure having a pair of flexible adjacent stringers, cooperating slide fastener teeth in series on said stringers and a slider for engaging and disengaging said teeth progressively along the extent of said stringers, and flexible sealing elements mounted directly upon and supported by said teeth and said stringers at a face of the structure for closing the latter and having elastic marginal portions tapering to edges, said sealing elements presenting sealing surfaces extending approximately normal but slightly inclined to said face and continuing to said edges, and said sealing elements in the open condition of the closure being positioned with said sealing surfaces substantially opposite and inclined toward one another in such relative position that in the closed condition of the closure at least one of said edges contacts and elastically presses against the other sealing surface in sealing relation therewith by lip-action flexure of the latter said edge.

14. A sealing closure comprising a structure having a pair of flexible adjacent stringers, cooperating slide fastener teeth in series on said stringers and a slider for engaging and disengaging said teeth progressively along the extent of said stringers, and flexible sealing elements on said stringers at a face of the structure for closing the latter and having marginal portions of resilient rubber-like material tapering to edges, said sealing elements presenting sealing surfaces extending approximately normal but slightly inclined to said face and continuing to said edges, which surfaces in the open condition of the closure are positioned substantially opposite and inclined toward one another in such relative position that in the closed condition of the closure said edges each contact and resiliently press against the opposite sealing surface in sealing relation therewith by lip-action flexure of said edges, said sealing elements including protruding portions adjacent said edges for guarding the latter.

15. A sealing closure comprising a structure having a pair of flexible adjacent stringers, cooperating slide fastener teeth in series on said stringers and a slider for engaging and disengaging said teeth progressively along the extent of said stringers, a flexible element mounted directly upon and supported by said teeth of one of said stringers at a face of the structure and presenting a sealing surface extending approximately normal but slightly inclined to said face, and a flexible sealing element generally L-shaped in section providing a base portion mounted directly upon and supported by said teeth of the other of said stringers at said face and a free portion of resilient rubber-like material extending laterally from said base toward said flexible element, said free portion tapering to an edge and presenting a second sealing surface extending outwardly to said edge in approximately normal but slightly inclined relation to said face, said flexible elements in the open condition of the closure being positioned with said sealing surfaces substantially opposite one another with at least one of said sealing surfaces inclined toward the other sealing surface in such relative position that in the closed condition of the closure said edge contacts and resiliently presses against the other sealing surface in sealing relation therewith by lip-action flexure of said edge.

16. A sealing closure comprising a structure having a pair of flexible adjacent stringers, cooperating slide fastener teeth in series on said stringers and a slider for engaging and disengaging said teeth progressively along the extent of said stringers, and sealing elements of resilient rubber-like material generally L-shaped in section providing base portions mounted directly upon and supported by said teeth and said stringers at a face of said structure and resilient free portions extending laterally from said base portions toward each other, said free portions tapering to edges and presenting sealing surfaces extending outwardly to said edges in approximately normal but slightly inclined relation to said face, said sealing elements in the open condition of the closure being positioned with said sealing surfaces substantially opposite and inclined toward one another in such relative position that in the closed condition of the closure said edges contact and resiliently press against said sealing surfaces in sealing relation therewith by lip-action flexure of said edges.

17. The method of molding a sealing element directly upon a series of spaced-apart fastener elements each including an engaging portion and a mounting portion at a margin of a stringer, which method comprises molding a sealing element against said fastener elements at said mounting portions and restraining flow of the material of said sealing element into zones between the fastener elements at said engaging portions by positioning a dam of yieldable material over said engaging portions adjacent said margin of the stringer, and removing the dam leaving the sealing element against said fastener elements at said mounting portions and overlying the latter elements at said engaging portions in separated relation thereto.

18. The method of molding a sealing element directly upon a series of spaced-apart fastener elements each including an engaging portion and a mounting portion at a margin of a stringer, which method comprises placing said stringer and fastener elements in a mold recess, positioning a dam of fibrous cord material over said engaging portions at a face of said fastener elements and adjacent the margin of said stringer, positioning a shield over said face of said fastener elements partially over the extent of said engaging portions with the margin of said shield against said dam, molding the sealing element against the fastener elements at said mounting portions, said dam and said shield, and removing said dam and said shield leaving the sealing element against said fastener elements at said mounting portions and overlying the fastener elements at said engaging portions in separated relation thereto.

19. The method of molding a sealing element directly upon a series of spaced-apart fastener elements each including an engaging portion and a mounting portion at a margin of a stringer, which method comprises molding a sealing element against said fastener elements at said mounting portions, restraining flow of the material of said sealing element into zones between the fastener elements at said engaging portions by positioning a dam of deformable material over said engaging portions and pressing the dam into contact with the marginal edge of said stringer conformingly with and into said zones at said engaging portions, and removing said dam leaving the sealing element against said fastener elements at said mounting portions and overlying the latter elements at said engaging portions in separated relation thereto.

20. The method of molding a sealing element directly upon a series of spaced-apart fastener elements each including an engaging portion and a mounting portion at a margin of a stringer, which method comprises placing said stringer and said fastener elements in a mold recess, placing a strip of lead material over said fastener elements covering thereby said engaging portions at least up to the margin of said stringer, deforming the lead strip by pressing it against said fastener elements so as to force part of said lead strip into the spaces between said engaging portions of said fastener elements and into contact with the margin of said stringer, molding a sealing element against said mounting portions and said lead strip, and removing said lead strip leaving the sealing element against said fastener elements at said mounting portions and overlying said fastener elements at said engaging portions in separated relation thereto.

21. The method of molding a sealing strip directly upon a series of spaced-apart fastener elements each including an engaging portion and a mounting portion at a margin of a stringer, which method comprises molding a sealing element of rubber-like material against said fastener elements at said mounting portions and against a part of said stringer and restraining flow of the rubber-like material of said sealing element into the spaces between said engaging portions of said fastener elements by means of a flexible element at said margin of the stringer, and molding a coating of rubber-like material on to said stringer in abutment with said sealing element, the rubber-like material of said coating, when cured, being of greater flexibility and lesser hardness than the rubber-like material of said sealing element.

CARROLL P. KRUPP.

REFERENCES CITED

The following references are of record in the file of this patent:

UNITED STATES PATENTS

| Number | Name | Date |
| --- | --- | --- |
| 596,009 | Trench | Dec. 21, 1897 |
| 602,671 | Trench | Apr. 19, 1898 |
| 1,839,068 | Waschiczeck | Dec. 29, 1931 |
| 1,871,120 | Denmire | Aug. 9, 1932 |
| 1,876,338 | Norton | Sept. 6, 1932 |
| 1,887,741 | Trotter | Nov. 15, 1932 |
| 1,991,943 | Keviczky | Feb. 19, 1935 |
| 2,067,737 | Roseman | Jan. 12, 1937 |
| 2,141,900 | Brown | Dec. 27, 1938 |
| 2,218,090 | Marinsky et al. | Oct. 15, 1940 |
| 2,264,085 | Loos | Nov. 25, 1941 |
| 2,289,586 | Marinsky | July 14, 1942 |
| 2,296,468 | Feist | Sept. 22, 1942 |
| 2,306,873 | Feist | Dec. 29, 1942 |
| 2,321,926 | Marinsky | June 15, 1943 |
| 2,371,776 | Van Orman | Mar. 20, 1945 |
| 2,385,816 | Krupp | Oct. 2, 1945 |
| 2,422,249 | Malluk | June 17, 1947 |